United States Patent
Berko et al.

(12)

(10) Patent No.: US 6,245,372 B1
(45) Date of Patent: Jun. 12, 2001

(54) PROCESS FOR PREPARING FOOD DRESSINGS

(75) Inventors: Mitchell Berko, Manalapan; Brian M. Sherwood, Morganville, both of NJ (US)

(73) Assignee: Walden Farms, Inc., Linden, NJ (US)

( * ) Notice: Subject to any disclaimer, the term of this patent is extended or adjusted under 35 U.S.C. 154(b) by 0 days.

(21) Appl. No.: 09/249,655

(22) Filed: Feb. 12, 1999

(51) Int. Cl.⁷ .................................... A23L 1/236
(52) U.S. Cl. .................. 426/548; 426/573; 426/589; 426/602; 426/804
(58) Field of Search ................ 426/548, 573, 426/589, 602, 603, 804

(56) References Cited

U.S. PATENT DOCUMENTS

| | | |
|---|---|---|
| 2,916,383 | 12/1959 | Nasarevich et al. . |
| 2,916,384 | 12/1959 | Bondi et al. . |
| 3,510,310 | 5/1970 | Breckwoldt . |
| 4,140,808 | 2/1979 | Jonson . |
| 4,163,808 | 8/1979 | DePaolis . |
| 4,299,856 | 11/1981 | Zirbel . |
| 4,547,384 | 10/1985 | Kryger . |
| 4,626,443 | 12/1986 | Takahashi et al. . |
| 4,701,338 | 10/1987 | Del Vento . |
| 4,722,844 | 2/1988 | Ozawa et al. . |
| 4,925,686 | 5/1990 | Kastin . |
| 5,102,681 | 4/1992 | Singer et al. . |
| 5,137,742 | 8/1992 | Bakal et al. . |
| 5,209,942 | 5/1993 | Bauer et al. . |
| 5,215,769 * | 6/1993 | Fox et al. ............................. 426/74 |
| 5,270,071 | 12/1993 | Sharp et al. . |
| 5,286,510 | 2/1994 | Bauer et al. . |
| 5,397,588 | 3/1995 | Antenucci et al. . |
| 5,508,055 | 4/1996 | Rubow et al. . |
| 5,626,901 | 5/1997 | Pedersen . |
| 5,652,011 | 7/1997 | Heertje et al. . |
| 5,721,004 | 2/1998 | James . |

* cited by examiner

Primary Examiner—Leslie Wong
(74) Attorney, Agent, or Firm—Lerner, David, Littenberg, Krumholz & Mentlik, LLP

(57) ABSTRACT

A process for preparing a fat free, calorie free food dressing includes combining flavors with spices and herbs and an acetic acid solution in a first container which is subsequently heated to destroy bacteria. Water, a sugar substitute, gums and a thickening agent are combined in a second container to form a second mixture. The water in the second mixture is chilled below ambient and filtered to remove substantially any contaminants therefrom. The chilled water prevents degradation of the sugar substitute during the manufacturing process. The two mixtures are combined and cooled to ambient temperature to form a finished food dressing.

23 Claims, 1 Drawing Sheet

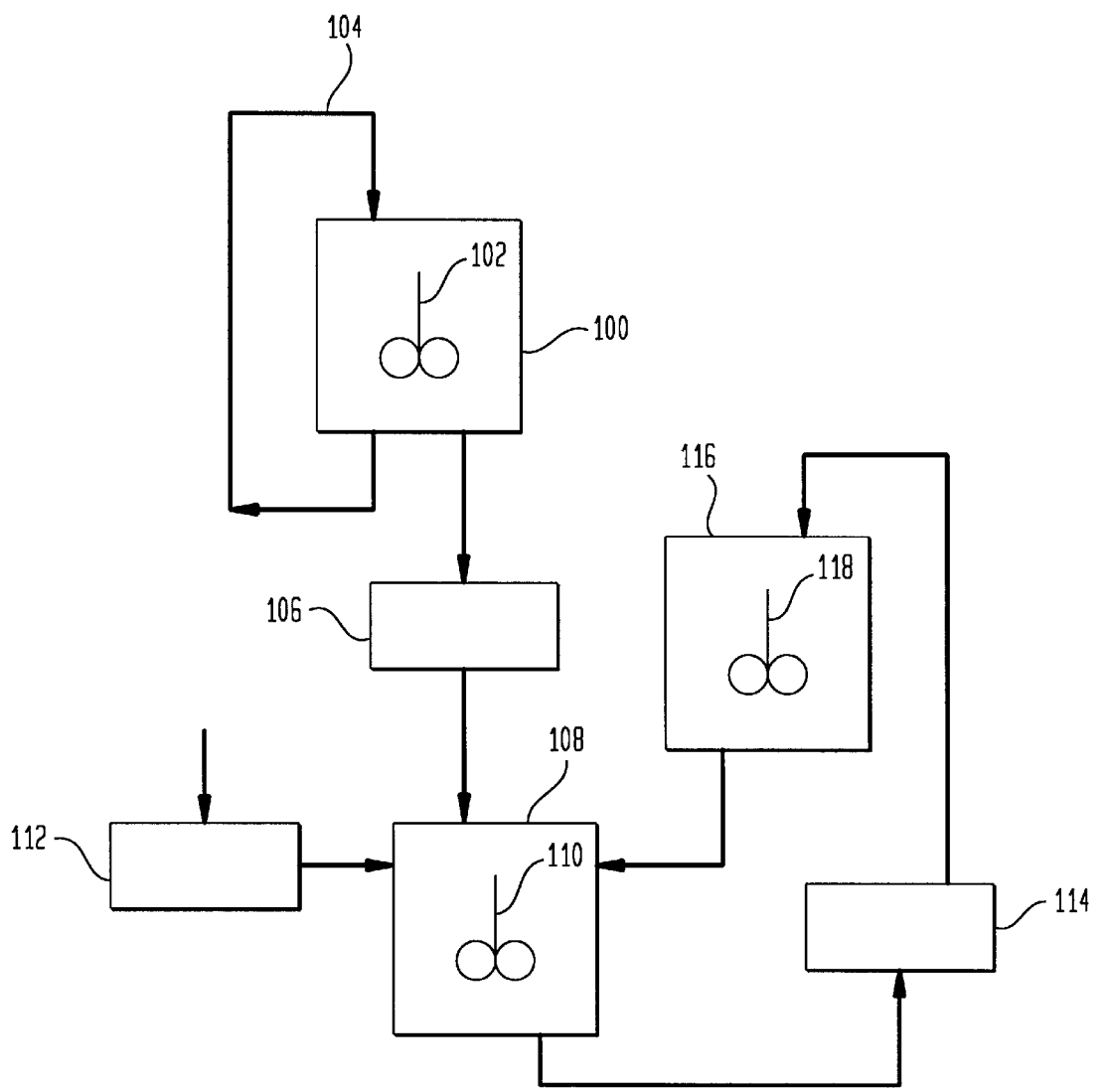

PROCESS FOR PREPARING FOOD DRESSINGS

FIELD OF THE INVENTION

The present invention relates in general to the art of food dressings and their preparation, and more particularly, to food dressings which are substantially free of fat and calorie containing ingredients, as well as to a process for preparing same.

BACKGROUND OF THE INVENTION

In recent years, food manufacturers have responded to growing consumer demand for providing food products that are fat free. Today's consumers concerned with their appearance and health are attempting to maintain slimmer and youthful physiques. However, most food products that claim to be "fat free" are not calorie free. Many of these products contain sugar and carbohydrates, so although the product contains no actual fat, the food product may have a high caloric content. For example, see Bauer, et al., U.S. Pat. No. 5,286,510; Singer, et al., U.S. Pat. No. 5,102,681; and Ambjerg Pedersen, U.S. Pat. No. 5,626,901. Consumers are being confused by the many products that claim to be "fat free" and believe that these food products will help them achieve their weight and health goals, when they may in turn lead to weight gain because of their high caloric content.

To many consumers attempting to keep their weight down or maintain a good physique, salads are an essential part of their diet. Salads have a low caloric content and constitute one of the few ordinary types of food which are almost universally recommended for people on low calorie diets. The majority of people consuming salads enhance the salad's flavor by adding a food dressing. Food dressings are conventionally very high in caloric content, and even those food dressings which claim to be "fat free" contain calories due to their sugar and carbohydrate content. It is desirable, therefore, to provide a food dressing which contains no oil, sugar, carbohydrates or cholesterol so as to be truly calorie free, as well as fat free.

Calorie free food dressings which include a sugar substitute to replace the sugar are known from Nosarevich, et al., U.S. Pat. No. 2,916,383 and Bondi, et al., U.S. Pat. No. 2,916,384. The use of sugar substitutes such as aspartame, saccharin and Acesulfame-K in other food products such as fruit spreads to provide a reduced calorie product is known from Antenucci, et al., U.S. Pat. No. 5,397,588. However, using a sugar substitute in place of sugar raises concerns regarding contamination of the food dressing. Much less of the sugar substitute by weight is required to replace the sugar in food dressings because typical sugar substitutes are many times sweeter than sugar. Thus, the amount of solids in the food dressing are severely decreased when using sugar substitutes, which results in a greater water activity in the food dressing. Food products with high water activity are breeding grounds for microorganisms such as bacteria. These food dressings are known to be sterilized, such as by heating to an elevated temperature, to prevent the growth of microorganisms in the food dressing. However, sugar substitutes typically are heat-sensitive, and will decrease in sweetness level if exposed to high temperatures as are often required during the sterilization process.

Accordingly, there is unsolved need for a food dressing which is calorie free by containing one or more sugar substitutes, as well as optionally being fat free, and for a process for preparing same by which the growth of microorganisms in the food dressing is inhibited while preventing degradation of the heat-sensitive sugar substitute.

SUMMARY OF THE INVENTION

One object of the present invention is to provide a calorie free food dressing which contains one or more heat-sensitive sugar substitute such as aspartame, sucralose, saccharin, Acesulfame-K and mixtures thereof. Another object of the present invention is to provide a process for preparing a food dressing in which the sugar substitute containing mixture is maintained in a sterilized, substantially bacteria free environment at a temperature below ambient to prevent degradation of the sugar substitute during manufacture. Another object of the present invention is to provide a calorie free food dressing which is additionally fat free.

The process of the invention generally includes the introduction of concentrated flavors, spices and herbs into a first container to form a first product. An aqueous emulsion is formed in a second container including a sugar substitute and a thickening agent to form a second product. The first product is heated to a sterilization temperature while the second product is maintained in a chilled state below ambient temperature. The first and second products are combined to form the finished calorie free product having a temperature which prevents degradation of the sugar substitute.

In accordance with one embodiment of the present invention there is described a process for preparing a food dressing containing a sugar substitute, the process comprising the steps of preparing a first mixture of food dressing ingredients, preparing a chilled second mixture of food dressing ingredients containing a sugar substitute and water at a first temperature below ambient temperature; heating the first mixture to a second temperature higher than room temperature and sufficient to substantially sterilize the first mixture, and combining the heated first mixture with the chilled second mixture to provide a food dressing at a third temperature lower than the second temperature which substantially prevents degradation of the sugar substitute.

In accordance with another embodiment of the present invention there is described a process for preparing a food dressing comprising mixing flavors, spices and herbs in a first container to form a first mixture; chilling water to a temperature between 40–65° F.; mixing the water, a sugar substitute and optionally a thickening agent and an emulsion forming agent in a second container to form a second mixture, the second mixture comprising greater than about 75% by volume of the food dressing; heating the first mixture to a temperature between about 160 and 180° F.; and combining the first mixture and the second mixture to form the food dressing.

BRIEF DESCRIPTION OF THE DRAWING

Further objects, features and advantages of the present invention will be more readily apparent from the detailed descriptions of the preferred embodiments set forth below, taken in conjunction with the accompanying sole drawing which is a flow diagram of the process in accordance with one embodiment of the invention.

DETAILED DESCRIPTION OF THE PREFERRED EMBODIMENTS

In describing the preferred embodiments of the subject matter illustrated and to be described with respect to the drawing, specific terminology will be resorted to for the sake of clarity. However, the invention is not intended to be limited to the specific terms so selected, and it is to be understood that each specific term includes all technical equivalents which operate in a similar manner to accomplish a similar purpose.

In accordance with the present invention, a calorie free food dressing is prepared by a process which isolates the sugar substitute which is sensitive to thermal degradation from those food dressing ingredients which are to be heated to a sterilization temperature for destruction of harmful microorganisms such as bacteria and the like. The sugar substitute is contained in a mixture of food dressing ingredients having a large volume of substantially bacteria free water, which has been chilled below ambient temperature, i.e., below 77° F. The remaining mixture of food dressing ingredients which have been subjected to heat sterilization contains a relatively small volume of water. Upon combining the two mixtures of ingredients, i.e., the heated mixture and chilled mixture, the resulting food dressing has a temperature which substantially prevents degradation of the sugar substitute, e.g., a temperature below about 80° F. By using ingredients which are also fat free, it is further possible pursuant to the process of the present invention to provide a food dressing which is not only calorie free, but also fat free, i.e., a food dressing which does not include certain food ingredients such as oil, sugar, carbohydrates or cholesterol which add to the fat and caloric content.

The food dressing of the present invention can be prepared using a variety of standard industrial equipment which are well known for use in the food processing industry. For example, these may include various containers, agitators, steam injectors, colloidal mills, heaters, pumps, water chillers, water filters and the like. The particular arrangement of equipment for preparing a calorie free food dressing pursuant to the process of the present invention is diagrammatically illustrated in the sole drawing.

As shown in the drawing, a first container 100 is provided with an agitator 102 and a recirculation system 104. The container 100 is provided with an outlet for discharging its contents to a steam injector 106 which empties into a second container 108 having an agitator 110. An ingredient aspirator 112 communicates with the second container 108. The second container 108 has an outlet in communication with a colloidal mill 114 which discharges into a third container 116 having an agitator 118. The third container 116 discharges its contents back into the second container 108. Before describing the specific process of the present invention, it is to be understood that the aforementioned equipment and their arrangement are merely illustrative of one embodiment of the present invention. In this regard, other forms of such equipment may be employed for their intended purpose as to be described. For example, although preferred, the agitators 102, 110, 118 may be omitted or substituted with other mixing type equipment either contained in or separate from the containers 100, 108, 116.

The present invention as thus far described relates to a process for producing calorie free dressings, and optionally fat free, for salads or other types of food products by eliminating sugar from the food dressing. The sugar is replaced by a sugar substitute such as aspartame, saccharin, sucralose, Acesulfame-K and/or mixtures thereof. There will now be described one example of a fat free, calorie free food dressing prepared in accordance with one embodiment of the present invention.

Ingredients typically used in the manufacture of food dressings are various known flavors. Flavors awaken the senses of the consumer by providing the characteristic taste and smell of the particular food dressing being made. Flavors may be obtained from any flavor house as known in the food industry and are used as a replacement for large amounts of raw food materials which can add a significant amount of calories to the food dressing. The composition and quantity of the flavors vary expectedly depending upon the type of food dressing being produced, e.g., Italian, Russian, Caesar dressings and the like. Preferably, the flavors are provided in a concentrated form, although non-concentrated flavors may also be used. When concentrated flavors are used, the total amount of water used in the preparation of the food dressing can be more closely monitored.

The flavors are introduced into the first generally cylindrical container 100. However, any appropriately sized and shaped container for receiving ingredients of the food dressing may be used. The first container 100 will generally include a device to prevent the contents of the first container from becoming stagnant. Preferably, the first container 100 will include an agitator 102 to keep the contents of the first container in a slightly agitated state while slightly mixing the contents. The first container 100 may also include a recirculation system 104 which also serves to keep the contents of the first container slightly agitated. Preferably, the recirculation system 104 is a series of pipes which draws the contents of the first container 100 from the bottom of the container and reintroduces them into the top of the container.

Spices and herbs as desired may be added to the flavors already in the first container 100. Preferably, the spices and herbs are dehydrated to allow the water content of the food dressing to be closely monitored, as in the case of the flavors. The spices and herbs are added to the flavors to further enhance the distinctive taste and smell of the food dressing as is known in the food art. An acetic acid solution, preferably vinegar, is added into the first container 100 to rehydrate the spices and herbs. A small amount of water may also be added into the first container 100. The addition of the water serves to increase the flow characteristics of the mixture in the first container 100. As a result, the mixture can more easily flow through the recirculation system 104 of the first container 100 and be mixed by the agitator 102.

The major quantity of water contained in the food dressing is provided in the second container 108. For example, it is contemplated that the water introduced into the second container 108 constitutes between about 65% and 85% by volume of the finished food dressing, and preferably between 70% and 80% by volume. This can occur either before, after or concurrent with the addition of the flavors into the first container 100. The second container 108 is of appropriate size and shape to contain the required water volume and further ingredients. Preferably, the water introduced into the second container 108 is chilled below ambient, for example, preferably to a temperature between 40 and 65° F., and most preferably about 44° F. A non-caloric sugar substitute such as aspartame, sucralose, saccharin, Acesulfame-K, mixtures thereof or the like is added to the chilled water in the second container 108. The chilled water prevents degradation of the heat-sensitive sugar substitute. In the preferred embodiment, the sugar substitute is aspartame.

As described above, contamination is of concern in food products with high water activity. Therefore, it is important to remove as many contaminants as possible from the ingredients used in the preparation of the food dressing. One way to reduce the quantity of contaminants in the food dressing is to use pure, uncontaminated water. Preferably, the water used in this method is substantially free from contaminants which can be achieved through filtration and/or sterilization. In the preferred method, the water provided at least in the second container 108, as well as preferably all water used in the process, is passed through a filtration system to keep the water as clean and pure as possible. For example, the water is passed through a triple filtration system, although any filtration system suitable for providing water which is substantially free from contaminants may be used. Preferably, the triple filtration system includes a 0.5 micron filter to insure the purity of the water although any similarly suitable filter may be used. Any other known process for providing water of at least a similar purity may be used.

As noted above, it is the use of sugar substitutes instead of sugar which raises concern of contamination of the food dressing. Sugar substitutes of the type described above are many times sweeter than sugar. In particular, aspartame is approximately 200 times as sweet as sugar. Thus, a much smaller amount of the sugar substitute is used compared to the amount of sugar in a regular food dressing. Sugar generally accounts for the bulk of the solids in typical food dressings and the replacement of the sugar with a sugar substitute results in a depletion of the majority of solids in the food dressing. In addition, while the sugar used in typical food dressings binds with the water, the sugar substitutes of the type described above do not bind with the water in the present food dressings. Thus, the depletion of solids and non-binding effect results in the present food dressing having a high level of water activity. Water, as noted, is a known breeding ground for bacteria. Thus, bacterial growth and contamination are a priority in food dressings with a high water activity. Although heat sterilization is a known solution, sugar substitutes such as aspartame are heat sensitive, and will decrease in sweetness when exposed to high temperatures. Therefore, it is desirable that the mixture containing the sugar substitute and final temperature of the food dressing be cool enough to keep the sugar substitute at maximum strength.

An emulsion is formed in the second container 108, for example, by adding gums which thicken the mixture. In the preferred embodiment, the gums are xantham and propylene glycol alginate, although other gums with similar properties may be used. In the preferred process, the gums are introduced to the second container 108 through an aspirator 112. However, the gums may be added into the second container 108 through any conventional means including, but not limited, to simply dumping the gums directly into the second container. The use of an aspirator 112 serves to remove lumps from the gums while creating a dispersion of the gums with the water-sugar substitute mixture. Water may be introduced into the aspirator 112 so as to create suction in the exit of the aspirator 112. This suction serves to aid the flow of the gums through the aspirator 112. The amount of gums added depends on the type of food dressing being prepared.

A thickening agent can also be added into the second container 108 through any suitable means. In the preferred embodiment, the thickening agent is cellulose gel. Cellulose gel aids in the thickening process while providing a smooth and oily mouthfeel. Cellulose gel need not be passed through the aspirator 112, and in the preferred process, is added directly into the second container 108. The second container 108 includes an agitator 110 in the nature of a high shear mixer which is used to mix the contents of the second container while reducing some of the lumps from the mixture. However, any suitable device for mixing the second mixture can be incorporated into the second container 108.

As food dressings are typically smooth and free from lumps, it is desirable to remove any lumps which may have formed in the second mixture due to the addition of the sugar substitute, gums or thickening agent. In the preferred process, the second mixture is pumped through a colloidal mill 114 which serves to polish and further remove lumps from the mixture. However, any suitable device may be used to remove the lumps from the second mixture. Water is added into the second container 108 while the mixture flows from the second container through the colloidal mill 114 to assist the flow of the mixture through the colloidal mill. The passing of the mixture through the colloidal mill 114 also serves to thoroughly mix the mixture.

After the mixture flows through the colloidal mill 114, the mixture is supplied to a third container 116. The third container 116 is appropriately sized and shaped to receive the mixture from the second container 108. The third container 116 may also include mixing means such as an agitator 118 to enable dispersion of additional items added to the mixture. For example, when preparing thousand island dressing, relish would be added to the mixture in the third container 116 and the agitator 118 would serve to incorporate the relish into the dressing. If no additional ingredients are being added into the mixture in the third container 116, it is generally not necessary for the agitator 118 to be in operation.

As noted above, contamination is of concern in food products with high water activity. Therefore, it is important to remove as many contaminants as possible from the present food dressing. Sterilizing the mixture in the first container 100 serves to destroy bacteria, yeast and mold which may be present. The method of sterilizing the mixture in the first container 100 is accomplished by subjecting the mixture to high heat. Preferably, this mixture is subjected to heat at a temperature great enough to destroy substantially the contaminants in the mixture without bringing the mixture to a boil. In the preferred embodiment of the process, the mixture is heated to between about 160 and 180° F. In the preferred embodiment, the mixture from the first container 100 is passed from the first container through a steam injector 106 to heat the mixture to the desired temperature, for example about 170° F. However, any suitable method of heating the mixture can be used. As the mixture passes through the steam injector 106, the heated mixture is deposited into a container appropriately sized and shaped to receive the heated mixture and the chilled mixture containing the sugar substitute. In the preferred embodiment, the heated mixture is deposited into the now empty second container 108.

Simultaneously with the depositing of the heated mixture into the empty second container 108, the chilled mixture in the third container 116 can be pumped into the same empty container. A small quantity of water may be added to the mixture in the third container 116 to assist the flow of the mixture into the empty second container 108. As the heated mixture and the chilled mixture from the third container 116 are simultaneously introduced into the empty second container 108, the two mixtures combine to form the finished product. The large volume of the chilled mixture containing the sugar substitute causes the temperature of the finished product to drop quick enough that the sweetness level of the sugar substitute is not affected by the high temperature of the heated mixture. It is contemplated in accordance with one example that the volume of the chilled mixture will be about 65% to 85% of the volume of the finished food dressing. The resulting temperature will preferably be less than about 80° F., and in accordance with one embodiment, in the range of from 75–80° F.

Although additional seasonings such as salt may be added to the first mixture, in the preferred process, the additional seasonings are added to the finished product. If added at the beginning of the process, the additional seasonings would cut down on the viscosity of the mixture in the first container 100. Also, incorporating additional substances such as salt into the mixture at the beginning of the process merely adds more mass to be heated.

After the finished product has cooled to approximately room temperature, the finished product is bottled. The finished product must then be refrigerated to inhibit bacterial growth, and upon refrigeration, has a shelf life of several months.

The following is one example of the present invention, and is therefore not to be interpreted as a limitation on the scope of the invention as claimed.

EXAMPLE 1

An example of the above process follows which yields 500 gallons of fat free, calorie free food dressing. Flavorings in an amount between 0.02% and 0.08% by volume of the total volume of ingredients is introduced into the first container 100. Dehydrated spices and herbs are then added into the first container 100. Approximately 8–20 gallons of vinegar is added into the first container 100 to rehydrate the dehydrated spices and herbs. An amount of water is then added into the first container 100 to enhance the flow characteristics of this mixture. The mixture is kept agitated by the agitator 102 in the first container 100. This mixture is also agitated by recirculating the mixture from the bottom of the first container 100 to the top of the first container. This first mixture represents approximately 100–125 gallons (20% to 25% by volume of the total volume of ingredients).

In the second container 108, the water to be added is chilled to approximately 44° F. The water is passed through a triple filtration system with a 0.5 micron filter before being introduced into the second container 108. Propylene glycol alginate and xantham are introduced into the second container through an aspirator 112. Cellulose gel is then added into the second container 108. Aspartame in an amount of about 0.02–0.035 wt. percent is introduced into the second container. The second mixture represents approximately 375–400 gallons (75% to 80% by volume of the total volume of ingredients).

The first mixture is passed through the steam injector 106 and heated to a temperature of approximately 170° F. The first mixture and the second mixture are then combined in the empty second container 108. The combination of the two mixtures yields a finish product with a temperature of approximately between 75 and 80° F. Salt is then added to the finished product. The finished product is bottled and refrigerated.

Although the invention herein has been described with reference to particular embodiments, it is to be understood that the embodiments are merely illustrative of the principles and application of the present invention. It is therefore to be understood that numerous modifications may be made to the embodiments and that other arrangements may be devised without departing from the spirit and scope of the present invention as defined by the claims.

What is claimed is:

1. A process for preparing a food dressing containing a sugar substitute, said process comprising the steps of preparing a first mixture of food dressing ingredients, preparing a chilled second mixture of food dressing ingredients containing a sugar substitute and water at a first temperature below ambient temperature; heating said first mixture to a second temperature higher than room temperature and sufficient to substantially sterilize said first mixture, and combining the heated first mixture with the chilled second mixture to provide a food dressing at a third temperature lower than said second temperature which substantially prevents degradation of said sugar substitute, wherein said third temperature is less than about 80° F.

2. The process for preparing a food dressing as claimed in claim 1 wherein said sugar substitute is selected from the group consisting of aspartame, saccharin, sucralose, Acesulfame-K and mixtures thereof.

3. The process for preparing a food dressing as claimed in claim 1 further including the step of forming an emulsion from said second mixture.

4. The process for preparing a food dressing as claimed in claim 1 wherein said first temperature is in the range of from about 40–65° F.

5. The process for preparing a food dressing as claimed in claim 4, wherein said first temperature is about 44° F.

6. The process for preparing a food dressing as claimed in claim 1 wherein said second mixture constitutes greater than 75% by volume of the food dressing.

7. The process for preparing a food dressing as claimed in claim 1 wherein said first mixture is heated by passing through a steam injector.

8. The process for preparing a food dressing as claimed in claim 1, wherein said second temperature is in the range of about 160–180° F.

9. The process for preparing a food dressing as claimed in claim 1 wherein said water is passed through a filtration system for removing particles greater than about 0.5 microns.

10. The process for preparing a food dressing as claimed in claim 1 further including the step of adding water to said first mixture, wherein said water in said second mixture comprises about 65 to 85% by volume of said water in said food dressing.

11. The process for preparing a food dressing as claimed in claim 1 further including the step of passing said second mixture through a colloidal mill before combining said second mixture with said first mixture.

12. The process of claim 1, further including packaging said food dressing while maintaining its temperature below about 80° F.

13. A process for preparing a food dressing comprising mixing flavors, spices and herbs in a first container to form a first mixture; chilling water to a temperature between 40–65° F.; mixing said water, a sugar substitute and optionally a thickening agent and an emulsion forming agent in a second container to form a second mixture, said second mixture comprising greater than about 75% by volume of said food dressing; heating said first mixture to a temperature between about 160 and 180° F.; and combining said first mixture and said second mixture to form said food dressing.

14. The process for preparing a food dressing as claimed in claim 13, wherein said sugar substitute is selected from the group consisting of aspartame, saccharin, sucralose, Acesulfame-K and mixtures thereof.

15. The process for preparing a food dressing as claimed in claim 13 wherein said water is chilled to about 44° F.

16. The process for preparing a food dressing as claimed in claim 13, wherein said first mixture constitutes less than about 25% by volume of the food dressing.

17. The process for preparing a food dressing as claimed in claim 13, wherein said first mixture is heated by passing through a steam injector.

18. The process for preparing a food dressing as claimed in claim 13, wherein said first mixture is heated to about 170° F.

19. The process for preparing a food dressing as claimed in claim 13 wherein said water is passed through a filtration system for removing particles greater than about 0.5 microns.

20. The process for preparing a food dressing as claimed in claim 13, further including the step of passing said second mixture through a colloidal mill before combining said second mixture with said first mixture.

21. The process for preparing a food dressing as claimed in claim 13, wherein the temperature of said first and second mixtures when combined is less than about 80° F.

22. The process of claim 13, further including packaging said food dressing without further heat treatment.

23. The process of claim 22, wherein the temperature of said first and second mixtures when combined is less than about 80° F.

* * * * *

UNITED STATES PATENT AND TRADEMARK OFFICE
CERTIFICATE OF CORRECTION

PATENT NO. : 6,245,372 B1
DATED : June 12, 2001
INVENTOR(S) : Berko et al.

Page 1 of 1

It is certified that error appears in the above-identified patent and that said Letters Patent is hereby corrected as shown below:

Title page, item [54], column 1, line 1,
"PROCESS FOR PREPARING FOOD DRESSINGS" should read -- FOOD DRESSINGS AND PROCESS FOR PREPARING SAME --.

Column 7,
Line 5, "finish" should read -- finished --.

Signed and Sealed this

Twenty-fifth Day of December, 2001

Attest:

JAMES E. ROGAN
Attesting Officer
Director of the United States Patent and Trademark Office